Figure 1:
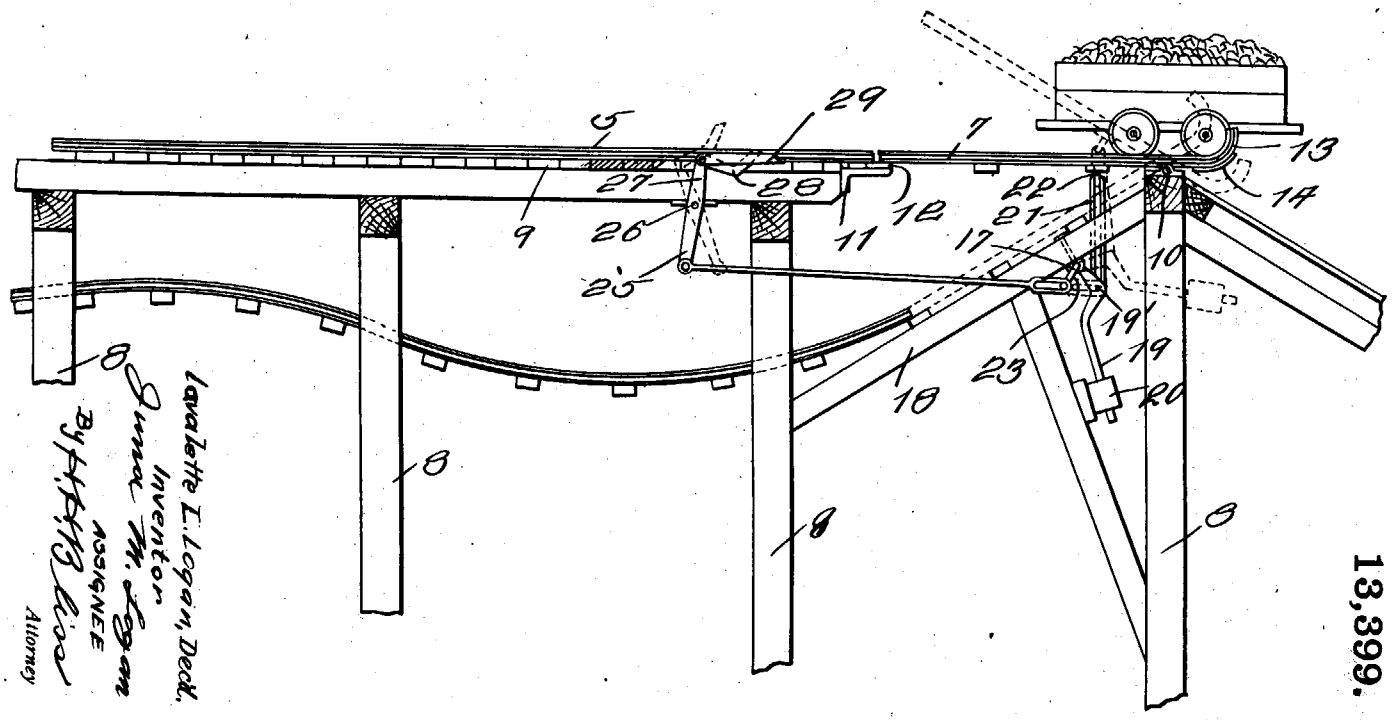

L. L. LOGAN, DEC'D.

J. M. LOGAN, ASSIGNEE.

CAR HANDLING APPARATUS.

APPLICATION FILED JUNE 21, 1911.

Reissued Apr. 9, 1912.

2 SHEETS—SHEET 1.

13,399.

WITNESSES

N. Curtis Lummond

S. Jay Teller

Lavalette L. Logan, Decd.
Inventor
Juna M. Logan
ASSIGNEE
By H. H. Bliss
Attorney

L. L. LOGAN, DEC'D.

J. M. LOGAN, ASSIGNEE.

CAR HANDLING APPARATUS.

APPLICATION FILED JUNE 21, 1911.

Reissued Apr. 9, 1912.

2 SHEETS—SHEET 2.

13,399.

WITNESSES

N. Curtis Hammond

S. Jay Teller

Lavalette L. Logan, Decd.
Inventor

Jonna M. Logan
ASSIGNEE

By H. H. Bliss.
Attorney

COLUMBIA PLANOGRAPH CO., WASHINGTON, D. C.

UNITED STATES PATENT OFFICE.

LAVALETTE L. LOGAN, DECEASED, LATE OF ROBERTSDALE, PENNSYLVANIA, BY JUNA M. LOGAN, OF FALLS TOWNSHIP, WYOMING COUNTY, PENNSYLVANIA, ASSIGNEE BY MESNE ASSIGNMENTS.

CAR-HANDLING APPARATUS.

13,399. Specification of Reissued Letters Patent. Reissued Apr. 9, 1912.

Original No. 753,719, dated March 1, 1904, Serial No. 157,278. Application for reissue filed June 21, 1911. Serial No. 634,651.

*To all whom it may concern:*

Be it known that LAVALETTE L. LOGAN, deceased, late a citizen of the United States and resident of Robertsdale, in the county of Huntingdon and State of Pennsylvania, was the original, first, and sole inventor of certain new and useful Improvements in Car-Handling Apparatus, of which the following is a specification, reference being had therein to the accompanying drawings.

The car-handling and dumping apparatus to which this invention relates includes superposed tracks upon which cars are adapted to travel and mechanism for causing a car to be transferred from one track to the other.

The object of the invention is to provide a car-handling and dumping apparatus having an improved arrangement of tracks, together with means for transferring a car from one track to another, means for effecting the dumping of the car and means for controlling the transferring and dumping means.

In the adaptation of the apparatus illustrated in the accompanying drawings, forming a part of this specification, said apparatus includes two tracks, a shiftable track-section normally in working relation with one of said tracks and movable into working relation with the other track, and automatic means for operating said shiftable track-section, the car being discharged while upon said shiftable track-section. In order to secure simplicity, the tracks in question are mounted in superposed relation or at different levels, the shiftable track-section normally constituting, in effect, a continuation of the upper one, so that a car can pass from said upper track onto the shiftable track-section and after being dumped can be transferred by said shiftable track-section to the lower track.

This invention is not limited to the exact disclosure made by the drawings above mentioned and the following description, for, as the said LAVALETTE L. LOGAN is considered a pioneer, material and divers changes may be made in the character and relations of the parts, as well as other features, within the scope of the claims succeeding said description.

Figure 2:
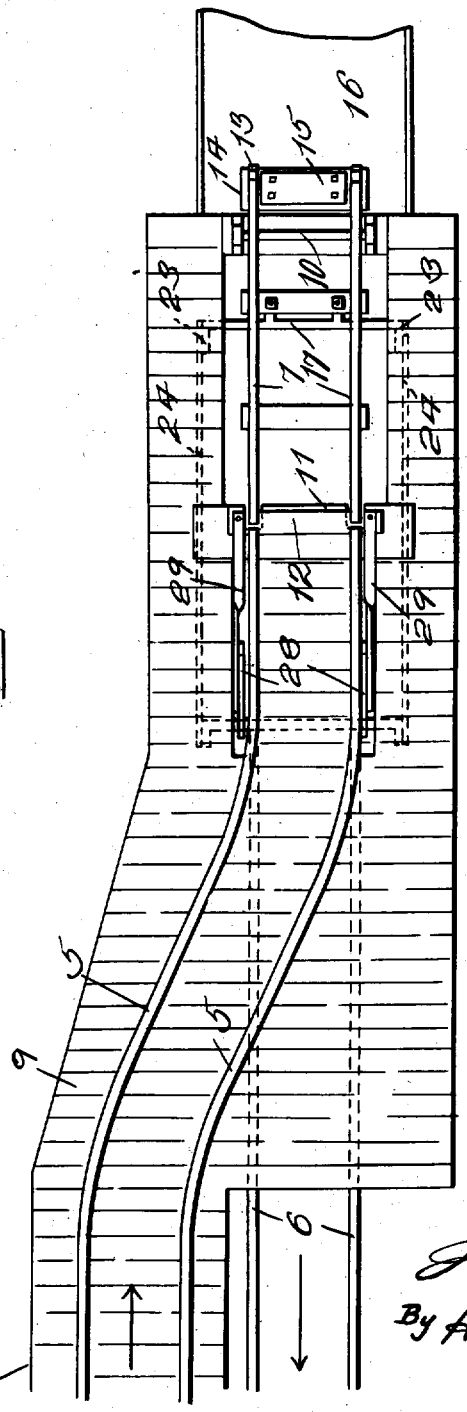

Referring to the drawings, Figure 1 is a side elevation of an apparatus involving the said invention. Fig. 2 is a plan view of said apparatus.

Like characters refer to like parts throughout the views.

The apparatus in the form thereof illustrated by the accompanying drawings, involves in its construction tracks 5 and 6, which are represented as being in superposed relation or one above the other. Of course when mention is made of said tracks being "superposed" it is meant that this relation is adopted near their outer ends, for it is not essential what their relation be at a point remote from that at which the cars are dumped. The upper track is preferably at a slight downward inclination in order to facilitate the gravitation of the filled cars onto a shiftable track-section, as 7. The framework for carrying the tracks 5 and 6 and the shiftable track-section 7 is denoted in a general way by 8, and as it may be of any suitable character a detailed description of the same is deemed unnecessary except to remark that it is provided along its top with a deck or platform 9, upon which attendants may walk to reach the cars. The shiftable track-section 7 is illustrated as being oscillatory in order that it may be tipped to secure the emptying of a car thereon.

The oscillatory track-section is suitably fastened to a rock-shaft 10, carried by suitable bearings upon the framework 8. Said oscillatory track-section 7 is normally in working relation with the upper track 5, it constituting virtually a continuation of said upper track, as seen by full lines in Fig. 1. The distance between what might be considered the inner or left end of the shiftable or oscillatory track-section and its center of motion is greater than that between the opposite end and said center of motion, and means are provided for positively preventing the depression of the left hand or inner portion of said track-section as a car enters the same, and the means illustrated for this purpose will now be set forth.

Fastened to the outer ends of the side girders constituting a part of the framework 8 is a beam or bracket 11, represented as being approximately angular in cross-section, and the horizontal web of which is in a plane under the free ends of the terminal rails of the upper track, against which terminal rails those of the track-section are adapted to abut, or approximately so when said track-section is in working relation with said upper track. The web of said beam projects outward beyond the free ends of said terminal rails and under those of said track-section when the latter is in the position shown by full lines in Fig. 1. This beam or bracket 11 constitutes a suitable support for a latch 12, which engages under the inner free end of the shiftable track-section 7, so as to maintain the latter in its normal position or approximately in line with the upper track 5. This latch 12 is slidable inwardly, so as to be moved from under the inner free end of the shiftable track-section in order to release the inner free end of said track-section, whereby the left branch of said track-section, which, it will be seen, is of approximately lever form, may drop in order to bring its inner end into working relation with the entering end of the lower track 6, as shown by dotted lines in Fig. 1, so that an empty car from said track-section can pass therefrom and onto the said lower track. As the inner branch of the movable track-section moves downward the inner ends of the rails thereof pass through the notches or apertures in the outer edge of the beam or bracket 11, which notches were uncovered by the latch as it was moved into its ineffective position. This latch, as will hereinafter appear, is automatically operated.

It will be assumed that a car has been run onto the shiftable track-section 7 and that its contents have been discharged, which operation takes place at the outer end of said track-section: After the car has been emptied the inner portion of said track-section is caused to automatically drop to bring the inner ends of the rails thereof into coincidence with the entering ends of the rails of the lower track 6, whereby the empty car can pass from the track-section onto said lower track, it being understood, of course, that said track-section at this time is at an inclination, so that the empty car can freely pass onto the said lower track. The outer portion of the lower track is first at a descending inclination and then at an ascending inclination, so as to insure the travel of the empty cars onto the inner and slightly downwardly-inclined portion of said lower track.

The outer end of the track-section 7, or that branch thereof to the right of its center of motion, has a stop or bumper 13 for the cars, against which stop or bumper the forward wheels of said car are adapted to strike. This stop may be formed by curving the outer ends of the rails of said track-section upward. Said rails at the right of the center of motion are united upon their under sides by a plate 14, to the upper side of which is suitably fastened a weight 15, which slightly overbalances the left branch of the track-section, and the purpose of which is to return said track-section to its normal position after the delivery of an empty car onto the lower track. The right branch of the track-section should be of such a length that when a filled car is upon said track-section the center of gravity of the filled car will be to the outside or right of the center of motion of said track-section, whereby the right branch of the latter will be lowered and the left one elevated, the parts being so proportioned generally that upon such motion the track-section will assume an angle of about thirty degrees to the horizontal, as indicated by dotted lines in Fig. 1, whereby the filled car upon the track-section will be automatically tilted, so that its contents can pass therefrom and onto a chute or runway 16, located with its entering end in proximity to the shaft 10. The chute 16 serves to receive the material dumped from the car and to convey it to a desired point out of vertical alinement with the point of discharge from the car. It will be understood that when the forward wheels of the filled car strike against the stop or bumper 13 the right branch of the track-section is lowered and that the left one is elevated in order to effect automatically the dumping of said car, as will hereinafter be more fully set forth.

A horizontally-disposed rock-shaft 17 is carried by suitable bearings upon the diagonally-disposed parallel struts 18, constituting part of the framework 8, which struts are united upon their upper sides by suitable ties in order to provide a rigid structure for upholding the inner branch of the track-section when the same is lowered, as previously indicated. The deck or platform 9 at its outer end of course is cut away to permit the free downward-tilting movement of the track-section. Parallel arms 19 depend from the rock-shaft 17 and are united near their lower ends by a weight 20, which normally rests against a suitable buffer on the frame-work 8. The arms 19 and connecting-weight 20 constitute a suitable lever for automatically operating the track-section 7 to bring the same into coincidence with the lower track 6, and the arms 19, constituting a part of the same, have outwardly-disposed angular portions connected by the cross-rod 19', which passes through longitudinal slot in the links 21. The upper ends of these longitudinally-slotted links are united with the eye-bolts 22, depending from the under side of the track-section 7 at the left of its axis. By this construction provision is made for a certain amount of lost motion between the lever and shiftable track-section. In other words, the connections between the shiftable track-section and the actuating shifting-lever therefor involve a sliding or loose joint.

At the opposite ends of the rock-shaft 17 are alined crank-arms 23, having pins working in longitudinal slots at the forward ends of the connecting rods 24. The rear ends of these connecting-rods 24 are pivoted to the lower ends of the crank-arms 25, depending from the rock-shaft 26. From the upper side of the rock-shaft 26 crank-arms 27 rise, said crank-arms having elbow-shaped forwardly-extending branches 28, the purpose of which will hereinafter appear. At the junction of the bodies of the arms 27 with their branches 28 are pivoted the straps 29, the forward ends of which are suitably united to the sliding latch 12. The crank-arms 25 and 27 and shaft 26 constitute a rocker for transmitting the motion of the counter-weighted lever hereinbefore mentioned to the latch 12, and it will be understood that the connections between said parts involve a sliding or slip joint in order, as in the other case hereinbefore mentioned, to provide for a certain amount of lost motion of one of the parts relative to another.

The purpose of the weight 20 is to lower the left or inner branch of the track-section 7 automatically into registration with the lower track 6 after the contents of a car have been discharged therefrom and after all the wheels of said car have been replaced upon said track-section if such replacing is necessary, said weight being automatically elevated by virtue of its connection with the track-section when the inner branch of the latter is raised by a loaded car, as hereinbefore indicated.

It will be assumed that a filled car has been run from the track 5 onto the track-section 7 and that said track-section has been tipped. After the track-section has reached an angle of thirty degrees to the horizontal, as herein before indicated, the car will be further tipped automatically to such an angle that the contents thereof can freely gravitate onto the chute or runway 16. When said track-section is in its normal position, the lower walls of the longitudinal slots in the links 21 will be in contact with the cross-bar 19′, so that the instant that the left branch of said track-section is elevated a corresponding motion follows with respect to the weight 20 through the elevation of the arms 19. The weight will be carried toward the horizontal line, it being understood that the load upon the track-section at the right of the center of motion thereof overbalances said weight 20. The moment of the weight 20, however, when the latter is in its elevated position exceeds that at the right of said center when the car is empty. As soon as the car is emptied, it is swung downward, if necessary, by an attendant, so as to bring its rear wheels onto the track-section, and when this condition is reached the weight 20 can lower, and as it does so it pulls down on the links 21, and hence on the left branch of the track-section 7. As the downward movement of the weight 20 is an accelerated one, it will serve to carry said left branch downward to bring the inner end thereof into correspondence with the outer end of the lower track 6, it being understood that the latch 12 has been thrown to its ineffective position during the initial upward movement of the track-section 7. As just stated, the weight 20 during its descent has a rapid motion, so as to impart, through the intermediate connections, a corresponding motion to the shiftable track-section, whereby when said weight strikes its bumper (at which point the track-section will be in horizontal position) said track-section will be carried by its momentum into registration with the lower track. The latch 12 is operated from the weighted arms 19 mentioned. As the said weighted arms 19 are moved upward they serve, through the intermediate crank arms 23, to draw the connecting-rods forward, whereby through the agency of the straps 29, operatively connected, as hereinbefore set forth, with said rods, the latch 12 is moved from under the inner free end of the track-section. As the latch upon the initial movement of the track-section is thrown to its ineffective position the left branch of said track-section may be lowered by the falling weight 20 in order to permit the rolling of an empty car from said track-section onto the lower track. As soon as the empty car passes from the track-section onto said lower track the weight 15, which at this time is in its elevated position or that of its highest efficiency, can lower in order to return the track-section to its initial position, with the inner free end thereof in line with the upper track 5. When the weight 20 was elevated in the manner hereinbefore described, the arms 19 acted, through the intermediate connections, to draw the connecting-rods 24 to the right to shift the latch 12 into its ineffective position. By virtue of the sliding or loose connection between the crank arms 23 and said rods 24 said weight as it returns to its initial position to effect the automatic operation of the track-section will not thrust the rods 24 rearward or to the left, as in case it did the latch would be put into its effective position to block the complete return movement of the shiftable track-section 7. Means operative independent of said weight 20 are provided for returning the latch to its normal or effective position. When the weight 20 strikes its buffer the pins at the free ends of the crank-arms 23 will be at or near the inner ends of the slots in said connecting-rods, said pins traversing said slots during the falling of said weight. The free ends of the angular branches 28 as the rods 24 are drawn toward the right under the action of the ascending weighted arms 19 are elevated to a point above the top of the track 5 and in position to be engaged by the treads of the forward wheels of a filled car, it being understood that the said free ends are located back of the junction between the free end of the track 5 and the inner free end of the track-section 7. Of course, the free ends of the branches 28 are maintained in this position until they are engaged by the treads of the forward wheels of a filled car. As soon as said treads strike said free ends the branches 28 will be lowered to their initial positions, whereby the crank-arms 25 are swung toward the left, the rods 24 moving into corresponding directions, so as to carry the outer ends of the slots in said rods against the pins at the free ends of the crank-arms 23. During the lowering of said branches 28 by the wheels the rods or straps 29 are thrust toward the right, so as to carry the sliding latch 12 under the inner free end of the track-section 7, which latter in the interval had resumed its primary position. By virtue of the loose connections between the track-section 7 and the links 21 the inner branch of said track-section can have a lowering movement without imparting a thrust to the weighted arms 19. During the ascending movement of said inner branch under the action of the weight 15 the links 21 will have an ascending movement relatively to the at this time stationary weighted arms 19, and when the track-section reaches its normal position the lower walls of the slots of said links will strike the cross-bar 19′ in order to positively arrest said track-section when it reaches said normal position, it being understood that the weight 15 underbalances the weight 20.

It will be observed that in the form of apparatus illustrated, the center lines of the two superposed tracks, the center line of the pivoted track-section and the center line of the material receiving chute are all located in the same vertical plane. I prefer this particular arrangement of parts for the reason that the construction is then much more simple and compact than it would be with any other arrangement. The framework necessary for supporting the tracks and the chute is a very simple one and the construction has the further advantage that neither the car nor the material within it need be deflected laterally at any time during the operation of the mechanism.

What is claimed as the invention of the said Lavalette L. Logan is:

1. An apparatus of the class described including superposed tracks, a track section supported for oscillation between its ends, adapted normally to occupy a position in working relation with the upper track and shiftable into working relation with the lower track, a latch for holding said track-section in its normal position, and mechanism operative with the said track-section for moving the latch into its ineffective position.

2. An apparatus of the class described including superposed tracks, a track-section supported for oscillation between its ends, adapted normally to occupy a position in working relation with the upper track and shiftable into working relation with the lower track, a latch for holding said track-section in its normal position, mechanism operative with the said track-section for moving the latch into its ineffective position, and independent means for moving the latch into its operative position.

3. An apparatus of the class described including superposed tracks, a track-section supported for oscillation between its ends, adapted normally to occupy a position in working relation with the upper track and shiftable into working relation with the lower track, a latch for holding said track-section in its normal position, mechanism operative with the said track-section for moving the latch into its ineffective position, and car-operated means for moving said latch into its effective position.

4. An apparatus of the class described including superposed tracks, a track-section normally in working relation with the upper track, supported for oscillation between its ends and its inner branch being longer than its outer one, a latch for holding the track-section in its normal position, and automatic mechanism for throwing the said latch into its ineffective position, and for subsequently moving the track-section into working relation with the lower track.

5. An apparatus of the class described including superposed tracks, a track-section normally in working relation with the upper track, supported for oscillation between its ends, its inner branch being longer than its outer one and the latter having a car-stop, a latch for holding the track-section in its normal position, and automatic mechanism for releasing said latch and subsequently moving the said track-section into working relation with the lower track.

6. An apparatus of the class described including superposed tracks, a track-section normally in working relation with the upper track, supported for oscillation between its ends and its inner branch being longer than its outer one, means for holding the track-section in its normal position, mechanism for moving the track-section into working relation with the lower track, and independent means for subsequently returning said track-section to its normal position.

7. An apparatus of the class described including superposed tracks, a track-section normally in working relation with the upper track, and automatically-operative mechanism for moving the track-section out of its normal position and into working relation with the lower track and for subsequently returning said track-section to its normal position.

8. An apparatus of the class described including superposed tracks, a track-section normally in working relation with the upper track, supported for oscillation between its ends and its inner branch being longer than its outer one, the latter having a stop for a car whereby when the car strikes said stop said inner branch can be elevated by the weight in the car, automatically-operative mechanism thrown into action by the elevation of said inner branch for lowering the latter into coincidence with the lower track, and means for returning said track-section to its initial position.

9. An apparatus of the class described including superposed tracks, a track-section normally in working relation with the upper track and shiftable into working relation with the lower one, a latch for holding the track-section normally in its working position, and automatic mechanism for operating the latch to effect the release of the shiftable track-section.

10. An apparatus of the class described including superposed tracks, a track-section normally in working relation with the upper track, supported for oscillation between its ends and its inner branch being longer than its outer one, and an operating device for moving the shiftable track-section into working relation with the lower track, connected to said track-section by means involving a loose joint.

11. An apparatus of the class described including superposed tracks, a track-section normally in working relation with the upper track, supported for oscillation between its ends, a weighted lever constituting a device for shifting the track-section into working relation with the lower track, and a longitudinally-slotted link connecting the track-section and weighted lever.

12. An apparatus of the class described including superposed tracks, a track-section normally in working relation with the upper track supported for oscillation between its ends and its inner branch being longer than its outer one, a weighted lever operatively connected with the said longer branch by means involving a loose joint, and a latch for holding the track-section in its normal position, operatively connected with said weighted lever said lever serving to throw the latch into its ineffective position.

13. An apparatus of the class described including superposed tracks, a track-section normally in working relation with the upper track, supported for oscillation between its ends and its inner branch being longer than its outer one, a weighted lever operatively connected with the said longer branch by means involving a loose joint, and a latch for holding the track-section in its normal position operatively connected with said weighted lever, said lever serving to throw the latch into its ineffective position, and means in position to be operated by a car upon the upper track for moving the latch into its effective position.

14. An apparatus of the class described including superposed tracks, a track-section normally in working relation with the upper track, supported for oscillation between its ends and its inner branch being longer than its outer one, a latch for holding the track-section in its normal position, a weighted lever, a longitudinally-slotted link connected with the longer branch of the track-section and also with the weighted lever, a rocker operatively connected with the latch, and a longitudinally-slotted rod also connected with the rocker and operatively connected with said lever.

15. An apparatus of the class described including superposed tracks, the lower one of which has first a downward and then an upward inclination, and an oscillatory track-section shiftable into working relation with the respective tracks.

16. An apparatus of the class described including superposed tracks, a track-section normally in working relation with the upper track, supported for oscillation between its ends and its inner branch being longer than its outer one, and independent means acting against the branches for moving said track-section in opposite directions.

17. An apparatus of the class described including superposed tracks, a track-section normally in working relation with the upper track, supported for oscillation between its ends and its inner branch being longer than its outer one, a weight carried by the outer branch, and a counterweighted lever connected with the inner branch by means including a loose joint.

18. An apparatus of the class described including superposed tracks, a track-section normally in working relation with the upper track, supported for oscillation between its ends, and its inner branch being longer than its outer one, a bracket supported below the free end of the upper track, having notches for the passage of the rails at the inner end of said track-section, and a latch supported by said bracket and adapted to normally engage under the inner free end of said track-section.

19. An apparatus of the class described including superposed tracks, a track-section normally in working relation with the upper track, supported for oscillation between its ends and its inner branch being longer than its outer one, a counterweighted lever, a longitudinally-slotted link connecting the lever and inner branch of the track-section, a rocker the upper arm of which has a branch disposed in proximity to the upper track, a rod connected with the lower branch of the rocker and operatively connected by means including a loose joint with said weighted lever, a latch normally engaging under the inner branch of the track-section, and a connection between the upper branch of said rocker and the latch.

20. In a car dumping apparatus, the combination of two superposed tracks, a track-section mounted for oscillatory movement about a horizontal axis and adapted and arranged to register successively with the said superposed tracks, to receive a car from one of them and discharge it onto the other, and means for receiving material from a car in an inclined position on the oscillatory track-section and conducting the said material to points out of vertical alinement with the point at which the material is received from the car.

21. In a car dumping apparatus, the combination of two superposed tracks, a track-section mounted for oscillatory movement about a horizontal axis and adapted and arranged to register successively with the said superposed tracks to receive a car from one of them and to discharge it onto the other, and means for receiving material from a car on the oscillatory track-section and conducting the said material to points out of vertical alinement with the point at which the material is received from the car.

22. In a car dumping apparatus, the combination of two superposed tracks, a track-section mounted for pivotal movement about a horizontal axis and automatically operative mechanism for moving the section to register successively with the said superposed tracks to receive a car from one of them and to discharge it onto the other, and subsequently to register with the first track to receive a second car therefrom, and means for receiving material from a car in an inclined position on the pivotally mounted track-section.

23. In a car dumping apparatus, the combination of two superposed tracks, a track-section mounted for pivotal movement about a horizontal axis, automatically operative means for moving the pivoted track-section to register successively with the said superposed tracks to receive a plurality of cars, one at a time from one of the tracks and discharge them, one at a time onto the other track, and means for receiving material discharged from the cars when they are on the pivoted track-section.

24. In a car dumping apparatus, the combination of a track-section, pivotally mounted for movement about a horizontal axis, two superposed tracks, with one of which the pivoted section is adapted to register to receive a car and with the other of which it is adapted to register to discharge a car, the second of the said superposed tracks being inclined downward away from the pivoted track-section, means for supporting the pivoted section in register with the first said track, automatically operative mechanism for causing the pivoted track-section to be disengaged from the supporting means and to be moved into register with the second said track, and means for receiving material from a car when it is in an inclined position on the pivoted track-section.

25. In a car dumping apparatus, the combination of a track-section, mounted for oscillatory movement about a horizontal axis, two superposed tracks, with one of which the pivoted section is adapted to register to receive a car and with the other of which it is adapted to register to discharge a car, the second of the said superposed tracks being inclined downward away from the pivoted track-section, and means for receiving material from a car when it is in an inclined position on the pivoted track-section and conducting the said material to points out of vertical alinement with the point at which the material is received from the car.

26. In a car dumping apparatus, the combination of a track-section, two superposed tracks, with one of which the pivoted section is adapted to register to receive a car and with the other of which it is adapted to register to discharge a car, the two superposed tracks converging at the ends adjacent the pivoted section, means for supporting the pivoted section in register with the first said track, automatically-operative mechanism for causing the pivoted-track-section to be disengaged from the said supporting means and to be moved into register with the second said track, and means for receiving material from a car when in an inclined position on the pivoted track-section.

27. In a car dumping apparatus, the combination of a pivoted track section, two superposed tracks with one of which the pivoted section is adapted to register to receive a car and with the other of which it is adapted to register to discharge a car, the said superposed tracks converging at the ends adjacent the pivoted section and lying parallel to each other at a point remote from the pivoted section, means for supporting the pivoted section in register with the first said track while a car is being received, automatic means for causing the pivoted section to be disengaged from the supporting means and to be moved into register with the second said track, means for supporting the section in register with the second track while the car is being discharged thereonto, and automatic means for causing the disengagement of the section from the last said supporting means and for causing the return movement of the section into register with the first track.

28. In a car dumping apparatus, the combination of an oscillatory track-section, and two superposed tracks with one of which the oscillatory section is adapted to register to receive a car, and with the other of which it is adapted to register to discharge a car, the said superposed tracks converging at the ends adjacent the oscillatory section and diverging from each other at a point remote from the oscillatory section.

29. In a car dumping apparatus, the combination of two tracks, extending in the same general direction in proximity to each other, a shiftable track-section for transferring a car from one of the said tracks to the other of the said tracks, the said section serving to incline the car into dumping position, automatically-operative mechanism for causing the operation of the shiftable track-section, the said automatically operative mechanism being additional to the car and additional to the track-section itself, and means for receiving material from the car when in the said inclined dumping position.

30. In a car dumping mechanism, the combination of a track system comprising a track for the supporting and guiding of cars moving in one direction, a track in the same vertical plane with the first track for the supporting and guiding of cars moving in the opposite direction, and an oscillatory track section for transferring cars from the first track to the second, a part of the said track system being adapted for supporting a car in an inclined dumping position, and means for receiving material from a car when in the said inclined dumping position.

31. The combination with a car handling mechanism comprising two superposed tracks and an oscillatory track-section adapted to register successively with the two tracks to transfer a car from one of them to the other, of means for receiving material from the car when in an inclined position on the said car handling mechanism and conducting the said material to points out of vertical alinement with the point at which the material is received from the car.

32. The combination with a car handling mechanism, comprising two superposed tracks, a pivoted track-section adapted to register successively with the two tracks to transfer a car from one of them to the other, and automatically-operative mechanism for causing the operation of the pivoted track-section, the said automatically operative mechanism being additional to the car and additional to the track-section itself, of means for receiving material from the car when in an inclined position on the said car handling mechanism.

33. In a car dumping apparatus, the combination of two superposed tracks, an oscillatory track-section mounted for movement to register first with the upper track to receive a car and subsequently to register with the lower track to discharge the car, the said track section being adapted and arranged to first support the car in a position in alinement with the upper track and then in a position inclined downward in the direction of its movement onto the section, and means for receiving material from the car when in the said inclined position.

34. In a car handling apparatus, the combination of two superposed tracks, a pivoted track-section mounted for movement to register first with the upper track to receive a car and subsequently to register with the lower track to discharge the car, the said track-section being arranged and adapted to first support the car in a position in alinement with the upper track, and then in a position inclined downward in the direction of its movement onto the section, automatically-operative means for moving the track-section, and means for receiving material from the car when in the said inclined position.

35. In a car dumping apparatus, the combination of two superposed tracks, a track-section pivoted to oscillate with its center in the vertical plane passing through the centers of the two superposed tracks into register with one of them to receive a car and into register with the other to discharge a car, and a chute located with its center line also in the said vertical plane and positioned to receive material from a car in an inclined position on the pivoted section.

36. In a car dumping apparatus, the combination of two superposed tracks, a track-section pivotally mounted to oscillate with its center in the vertical plane passing through the centers of the two superposed tracks into register with one to receive a car and into register with the other to discharge a car, a chute for receiving material from a car in an inclined position on the said pivoted section the chute having its center line in the same vertical plane, and means for temporarily retaining the car on the pivoted section in dumping position and for then permitting it to pass to the second of the superposed tracks.

37. In a car dumping apparatus, the combination of two superposed tracks, a track-section pivotally mounted to oscillate into successive register with the said tracks, a releasable latch adapted for holding the section in register with the upper track during the passage of a car, and means for receiving material from a car when in inclined position on the pivoted section and conducting the said material to points out of vertical alinement with the point at which the material is received from the car.

38. In a car dumping apparatus, the combination of two superposed tracks, a pivotally mounted track-section adapted to oscillate into successive register with the said tracks, a latch for holding the track-section in register with the upper track, means for receiving material from a car in an inclined position on the track-section, automatic means for causing the movement of the track-section from register with the lower of the superposed tracks to register with the upper of the superposed tracks, and automatic means for causing the latch to engage the track-section.

39. In a car dumping apparatus, the combination of two superposed tracks, an oscillatory track-section adapted to receive a car from one of the superposed tracks and to deliver it to the other of the superposed tracks, means for holding the oscillatory section in alinement with the superposed track from which the car is received, means for moving the section into alinement with the superposed track to which the car is discharged, and a chute for receiving material from the car when it is in an inclined position on the track-section and conducting the said material to points out of vertical alinement with the point at which the material is received from the car.

40. In a car dumping apparatus, the combination of two superposed tracks, an oscillatory track section adapted to register with one of the superposed tracks to receive a car therefrom and adapted to register with the other of the superposed tracks to discharge a car thereonto, automatically operative devices for successively supporting the track-section in register with the respective superposed tracks, means for causing the movement of the track-section from register with the first track to register with the second track, means for receiving material from a car when in an inclined position on the oscillatory track-section, and automatic gravity controlled means for causing the oscillatory track section to return from register with the second of the superposed tracks, to register with the first of the superposed tracks.

41. In a car dumping apparatus, the combination of two superposed tracks, an oscillatory track-section adapted to register with one of the superposed tracks to receive a car and with the other of the superposed tracks to discharge a car, a latch for holding the oscillatory track section in alinement with one of the superposed tracks, and means controlled by the movement of the car along the said superposed tracks to move the latch.

42. In a car dumping apparatus, the combination of two superposed tracks, an oscillatory track-section adapted to register with one of the tracks to receive a car and with the other of the tracks to discharge a car, a latch for holding the track section in alinement with the upper of the superposed tracks, and means depending upon the movement of the car along the last said upper of the tracks for moving the latch.

43. In car-dumping mechanism, the combination with two superposed tracks, of an oscillatory track-section adapted in different angular positions about its axis to register with said tracks respectively, the axis of said track-section being spaced from the end of the upper of said tracks and lying substantially on a line with the lower thereof.

44. In car-dumping mechanism, the combination with two superposed tracks; of an oscillatory track-section adapted in different angular positions about its axis to register with said tracks respectively, the axis of said track-section being spaced from the end of the upper of said tracks and lying substantially on a line with the lower thereof; and means normally retaining said track-section in register with such upper track.

45. In car-dumping mechanism, the combination with two superposed tracks; of an oscillatory track-section adapted in different angular positions about its axis to register with said tracks respectively, the axis of said track-section being spaced from the end of the upper of said tracks and lying substantially on a line with the lower thereof; and means normally retaining said track-section in register with such upper track, the weight of a car on said track-section being sufficient to depress the same into register with such lower track.

46. In car-dumping mechanism, the combination with a downwardly inclined track and an upwardly inclined track therebelow, of an oscillatory track-section adapted in different positions about its axis to register with said tracks, respectively, the axis of said track-section being spaced from the end of the upper of said tracks and lying substantially on a line with the lower thereof, whereby a car received on said track-section from such upper track is dumped and transferred onto said lower track.

In testimony whereof I, JUNA M. LOGAN, assignee of the entire interest of the said LAVALETTE L. LOGAN, deceased, have affixed my signature in the presence of two witnesses this 13th day of June, 1911.

JUNA M. LOGAN.

Witnesses:
W. P. TOWNSEND,
H. A. SMITH.

Copies of this patent may be obtained for five cents each, by addressing the "Commissioner of Patents, Washington, D. C."